Patented Apr. 19, 1949

2,467,430

UNITED STATES PATENT OFFICE 2,467,430

ACROLEIN ACETAL POLYMERS

Emmette Farr Izard, Kenmore, N. Y., assignor to E. I. du Pont de Nemours & Company, Wilmington, Del., a corporation of Delaware No Drawing. Application March 6, 1945, Serial No. 581,338

1 Claim. (Cl. 260—85.7)

This invention relates to novel synthetic polymers and their preparation and is particularly concerned with a new class of polymers which are soluble in certain solvents and which can readily be converted into products having different solubility characteristics.

In connection with the study of synthetic polymers during the past few years, some attention has been given to the derivation of polymers, copolymers and interpolymers from monomeric vinyl compounds. However, the vinyl type polymers heretofore known are generally thermoplastic and possess softening points so low that the polymers have little or no value in certain industrial fields where moderately high softening points are required, e. g. the field of textile yarn. Many vinyl type polymers are soluble in a wide variety of common solvents and while this characteristic is desirable for some purposes, it is a deterrent to the manufacture of many types of shaped articles in which resistance to the solvent action of common solvents is needed.

One object of the present invention pertains to the preparation of novel polymers. Another object pertains to new polymers which can be readily converted to products having different chemical and physical characteristics which adapt them to special fields of use. A further object is concerned with the production of a new type of polymer which can be formed from solution or melt into any desired shape and can be easily converted thereafter, while in said shape, to another polymeric form in which the article has improved physical characteristics, for example different solubility or even insolubility in various solvents and, if desired, a different degree of thermoplasticity. It is a still further object to produce new vinyl type polymers. Other objects will appear hereinafter.

Certain known unsaturated aldehydes, such as acrolein, methacrolein and crotonaldehyde, although they possess a carbon-to-carbon unsaturation, have limited utility as polymer-forming materials since both the aldehyde groups and the carbon-to-carbon unsaturation take part in the polymerization reaction. Such polymers generally are of relatively low molecular weight, insoluble and infusible and incapable, for the most part, of being worked up into useful industrial products.

The objects of the present invention are accomplished in general by subjecting to polymerization a compound having carbon-to-carbon unsaturation and having a group or radical which is inactive as far as polymerization is concerned, said inactive groups in the resulting polymer being readily converted by hydrolysis, alcoholysis or saponification to aldehyde groups. In view of the inert character of said inactive groups with respect to polymerization and their ready conversion to aldehyde groups, these groups will be referred to hereinafter as "masked aldehyde" groups. Because of the "masking" of the aldehyde groups which are potentially contained in the monomeric material and in the polymers produced therefrom, the polymers are linear in character and may be of very high molecular weight. The polymer resulting from the hydrolysis, saponification or alcoholysis can, by virtue of the presence of the aldehyde groups in its molecule, be easily changed by chemical reaction in subsequent processing to polymeric derivatives having different characteristics, particularly with respect to solubility and thermoplasticity. Specifically, in accordance with the invention, the aldehyde groups are masked by means of ether groups or ether groups and halogen groups as will be described more in detail hereinafter.

The character of the invention can be illustrated by reference to the following simple chemical reactions. Acrolein acetal, i. e.

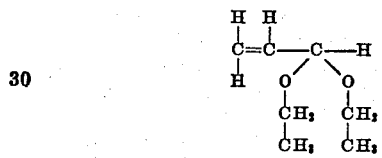

and vinyl acetate are mixed in a mol ratio of 1:2 and are then subjected to polymerizing conditions, yielding an alcohol-soluble product consisting of the following polymeric chain structure:

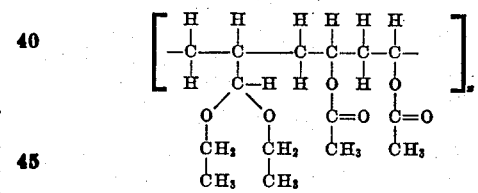

This structural formula is designated as Formula 1 and assumes a head-to-tail linking of acrolein acetal and vinyl acetate such as occurs in the polymerization of vinyl acetate by itself, acrolein acetal likewise presumably polymerizing by itself in the same head-to-tail fashion. The carbon atoms in the horizontal chain of Formula 1 are called chain carbon atoms for convenience. Upon subjecting the polymer of Formula 1 to hydrolysis, saponification or alcoholysis in alkaline medium, the ester groups are split off to yield a product having the polymer chain structure:

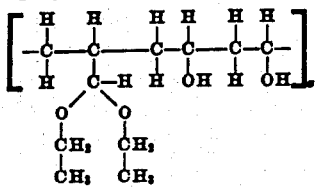

This structural formula is designated as Formula 2 and the polymeric compound of this formula is stable so long as it is not subjected to elevated temperature and/or acid conditions. In an acid medium, the acetal (ether) groups of this intermediate product hydrolyze off to yield momentarily the free aldehyde groups which immediately and automatically cross-link with the hydroxy groups, with the liberation of water, to form an insoluble, substantially infusible product such as is represented by the following structural formula:

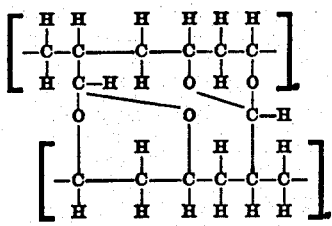

this structural formula being designated as Formula 3.

The subscript "$x$" occurring in the above Formulas 1, 2 and 3 represents the number of chain units in the polymer molecule.

In the above Formula 1, the "masked" aldehyde group

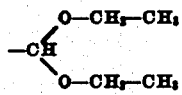

is shown directly connected to the polymeric chain and compounds of this general type are preferred in view of the availability of materials and simple synthesis, but the invention is not so limited. The above or an equivalent masked aldehyde group may be connected to the chain carbon atom either directly as shown in the above Formula 1 or through one or more carbon atoms or through any line of attachment that is free of hydrolyzable linkage, i. e. free of a linkage that will be severed by hydrolysis, saponification or alcoholysis. The importance of non-hydrolyzable linkage is obvious for, if hydrolysis (or alcoholysis or saponification) which unmasks the aldehyde group also breaks the linkage between the aldehyde group and the polymeric chain, the polymer loses its aldehydic character and the properties flowing from the presence of aldehyde groups in the polymer molecule.

Thus, the essential part of the polymer of Formula 1 is the presence of a dangling carbon atom having two valences satisfied with hydrolyzable groups which take no part in the polymerization reaction. Acrolein acetals and alpha-substituted acrolein acetals constitute a preferred family of compounds capable of being polymerized to yield linear addition polymers of this character. Acrolein ($CH_2=CH-CHO$) contains the double bond needed for linear addition polymerization, but the aldehyde group interferes with direct polymerization as stated above. The aldehyde group must therefore be covered or "masked" to prevent it from reacting and interfering with the synthesis of the linear polymer. The attachment of two ether groups is simple and generally preferred, but the aldehyde group may otherwise be immobilized or "masked," e. g. the aldehyde group may in part be covered by an ether group and in part by a halogen group and used with very satisfactory results.

In the illustration given above, both cross-linking groups (—CHO and —OH) are potentially available in the same polymer and generally, this is desirable, but not at all necessary in order to have synthetic addition polymers of improved utility. As indicated above, where both masked aldehyde groups and masked hydroxyl groups are present in the unhydrolyzed polymer, the polymer can be subjected to alkaline hydrolysis to free the hydroxyl groups and this may be desirable where insolubility is not immediately required. When masked hydroxyl groups or other masked aldehyde reactive groups are not present in the masked aldehyde polymer, the masking groups can be eliminated by acid hydrolysis or acid alcoholysis to yield a polymer containing aldehyde groups and the polymer can subsequently be cross-linked and thereby, if desired, insolubilized by being reacted with compounds containing aldehyde reactive groups in their molecules. Many polymers, natural and synthetic, have hydroxyl groups that will cross-link with the aldehyde groups contained in the polymers that may be formed through the practice of this invention. For instance, cellulose, partially substituted cellulose derivatives, glycol cellulose, polyvinyl alcohol or interpolymers thereof are excellent materials with which to effect cross-linkage. Furthermore, there are numerous polyfunctional compounds such as di- and polyhydric alcohols, e. g. glycerol, the glycols, polythioalcohols and diamines, which may be used effectively to cross-link polymers formed through the practice of this invention when the polymer itself contains no hydroxyl groups.

To produce polymers of certain solubility characteristics, the "masked" aldehyde compound may be interpolymerized with a major proportion of certain other ethylenic compounds having the desired solubility characteristics so that the aldehyde-containing polymer eventually formed may be used more advantageously. In the case of interpolymers of acrolein diacetal and vinyl acetate for example, a high mol ratio of vinyl acetate to acrolein diacetal, such as 10:1 or 20:1, gives polymers which, upon alkaline saponification, are readily water soluble by virtue of the unmasking of the hydroxyl groups while the acetal masking remains unchanged. Such polymers may subsequently be subjected to acid treatment to free the aldehyde groups which will immediately cross-link to consume all of the aldehyde groups, but there will still remain free a large percentage of the original hydroxyls which confer on the polymer relatively high water sensitivity (a large capacity for swelling in water) even though the polymer be no longer water soluble. In such cases, it may be desirable to acetalize all or part of the remaining hydroxyls with an aldehyde such as formaldehyde, acetaldehyde, butyraldehyde, etc. Sometimes it may be advantageous to have both cross-linking groups present in the ultimate polymer to only a minor extent, in which case a three or four component polymer may be produced.

The invention contemplates synthetic linear polymeric compounds containing in the chain the group:

(A) 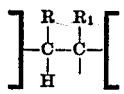

wherein R and $R_1$ are the same or different monovalent atoms or radicals (e. g. hydrogen, halogen, aryl, aralkyl, or substituted or unsubstituted, saturated or unsaturated, open chain or cyclic alkyl) and preferably R is hydrogen and $R_1$ is hydrogen, halogen or a saturated hydrocarbon radical, said group having joined thereto through the valence shown as unsatisfied and through a line of attachment free of hydrolyzable linkage the group:

(B) 

wherein $R_2$ is monovalent and alkoxy, alkylthio, aralkyloxy or aralkylthio and $R_3$ is $R_2$ or halogen, and wherein both $R_2$ and $R_3$ are free of unsaturated acyclic carbon-to-carbon bonds. In order that the line of attachment be free of hydrolyzable linkage, the group (B) must be directly connected to carbon which may or may not be the carbon of the polymeric chain. In the preferred embodiment of this invention, group (B) is directly connected to group (A). A few monomeric compounds capable of forming this type of polymer are acrolein acetal (allylidene diethoxide), acrolein butyral (allylidene dibutoxide), methacrolein acetal (alpha-methyl allylidene diethoxide), crotonaldehyde acetal (crotylidene diethoxide), cinnamic aldehyde acetal (cinnamylidene diethoxide), phenyl acrolein acetal (alphaphenylallylidene diethoxide) and allylidene ethoxide-chloride.

While the above mentioned monomeric compounds may be polymerized alone, it is generally preferred to interpolymerize one of these compounds with one or more ethylenic compounds having the general formula:

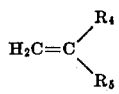

where $R_4$ is hydrogen, halogen or methyl and $R_5$ is hydrogen, halogen, methyl, methoxy, cyano, alkenyl, substituted alkenyl, alkinyl, acyloxy, acylthio, carbalkoxy, acyloxyalkyl, aryl, aralkyl, carbazyl, or pyridyl. Satisfactory interpolymerizing compounds include vinyl acetate, vinyl thioacetate, vinyl chloride, vinyl cyanide, vinyl fluoride, styrene, butadiene, chloroprene, isobutylene, methyl acrylate, methyl methacrylate, vinylidene chloride, ethylene, vinyl acetylene, vinyl carbazol, vinyl pyridine, etc.

Where monomeric compounds are used as the starting materials, polymerization may be carried out in any suitable manner commonly practiced for the production of polymeric vinyl compounds. As previously stated, the acrolein acetal (whether the full acetal or the half acetal) may be polymerized alone, in which case the polymer will contain only masked aldehyde groups, or it may be interpolymerized with other unsaturated compounds which may or may not contain masked hydroxyls. If desired, two, three or more interpolymerizing compounds may be combined with the masked aldehyde compound. The mol ratio of the masked aldehyde compound to the other interpolymerizing ingredient may vary widely, for instance from 1:2 to 1:20, more or less, depending upon the specific characteristics desired. Also, the degree of polymerization may range widely, the polymeric compounds having the molecular weights of from 1,000 to 100,000 or more.

The aldehyde groups may be formed from the masked aldehyde group containing polymer of the type previously set forth by hydrolysis in acid medium or by acid catalyzed alcoholysis. (For convenience, the term "hydrolysis" can be used to designate the "unmasking" reaction where a general term is desired for the purpose of referring to this reaction although the term "hydrolysis" is frequently given its more restricted meaning throughout this specification.)

Whenever the aldehyde group in a polymer is completely masked by an acetal, hydrolysis or alcoholysis is carried out in an acid medium to remove the acetal masking groups and thereby free the aldehyde groups. Half acetals, such as polyallylidene ethoxide-chloride may, however, be hydrolyzed or saponified either in alkaline or acid medium. When the alkaline saponification or alcoholysis is used in the case of the halfacetals and particularly where the polymer contains potential hydroxyl groups masked by ester groups, the masked aldehyde may not be unmasked immediately, for while the ester group is readily replaced by hydroxyl, the ether group may remain intact for a time although eventually the aldehyde will be unmasked. (In order to avoid confusion, where both masking groups are ether, such compounds will be called acetals and where only one of the two masking groups is ether, the compounds will be called half acetals.)

The following examples which are intended to illustrate rather than to limit the invention and in which parts, proportions and percentages are by weight unless otherwise specified, describe various modes of applying the principles of the invention.

*Example I*

A mixture of 4 parts of vinyl acetate and 1 part of acrolein acetal (allylidene diethoxide) containing 0.05 part of benzoyl peroxide as a catalyst was heated to reflux on a steam bath for a period of approximately forty hours, during which time the solution slowly thickened to a product which was a very viscous liquid when hot and solid when cold. This product which is an interpolymer of acrolein acetal and vinyl acetate was dissolved in methanol and to a small sample were added a few drops of concentrated hydrochloric acid and heated for a short time on a steam bath to hydrolyze. The reaction took place and the product coagulated quickly from solution to a product insoluble in water, methoxyethanol or alcohol. It is presumed that the hydrolysis caused the liberation of both hydroxyl groups and aldehyde groups, but that these groups immediately combined with each other to form an acetal of an insoluble character. This is an example of bulk polymerization (polymerization in the absence of solvent or dispersion medium.)

*Example II*

A mixture of 40 parts of methyl methacrylate, 10 parts of acrolein acetal (allylidene diethoxide) and 0.5 part of benzoyl peroxide was heated to reflux under a condenser. Polymerization began within fifteen minutes and proceeded fairly rapidly. The mixture was heated on a steam bath for four hours to complete polymerization.

A clear, transparent, substantially colorless interpolymer of methyl methacrylate and acrolein acetal resulted which was soluble in methoxyethanol and other solvents for methyl methacrylate polymer. On acid hydrolysis, this polymer will liberate free aldehyde groups since no other hydroxyls will be liberated to react with them.

When it is desired to have free aldehyde in the hydrolyzed polymer of this invention, one should not interpolymerize the masked aldehyde monomer of this invention with ethylenic compounds which will normally produce free hydroxyls upon hydrolysis, for liberation of the aldehyde requires acid hydrolysis and in the presence of acid, the free aldehyde will automatically cross-link with the hydroxyls, if present. Many times however, the polymer containing both acetal-masked aldehyde and ester-masked hydroxyl groups, such as is described in Example I, may be formed into the shape desired and then simply insolubilized by acid treatment.

Various other interpolymers of acrolein acetals and half acetals contemplated by this invention may be prepared by the methods set forth in the above examples.

The polymerization catalysts used include those which catalyze the polymerization of vinyl compounds, e. g. vinyl acetate; organic peroxides such as benzoyl peroxide and diethyl peroxide as well as other per-compounds such as ammonium persulfate (which may be activated by bisulfites such as sodium bisulfite and metasodium bisulfite) are effective catalysts for the polymerization.

The "masked aldehyde" polymers of this invention, in view of their relatively low softening points and their solubility in many solvents, are readily formed either by the wet or coagulation method, by the dry or evaporative method, or by the melt method of spinning or casting into all sorts of shaped articles such as sheets, films, wrapping tissue, tubing, filaments, bristles, yarns, threads and the like. Also, they may be used in various compositions, such as for coating, finishing, casting or molding, for adhesion, lamination and the like. They may be admixed with natural or other synthetic polymeric materials, added to spinning or casting dopes of filament- or film-formers and spun or cast into filaments or film. Specifically, the interpolymers comprised of vinyl acetate and acrolein acetal are especially useful in cellulose acetate or other cellulose ester or cellulose ether compositions. When the cellulose ester is hydrolyzed under acid conditions to remove acetyl groups to whatever desired degree, the masked aldehyde polymer is converted to a polymer having aldehyde groups which are at the same time cross-linked with the hydroxy group of the cellulose compound as well as the hydroxyl groups of the synthetic interpolymer. In fact, any structure such as is mentioned above as comprised of or containing the masked aldehyde polymer of this invention may be converted into an insoluble and difficultly fusible form by unmasking the aldehyde group of the polymer under such acid conditions as will cause it to react and produce cross-links.

When water soluble polymers are desired, it is a simple matter to convert suitable polymers of this invention such as the interpolymers of acrolein acetal containing a large predominance of vinyl acetate by saponification, or by alcoholysis in an alkaline medium into hydroxy-containing polymers, while retaining the acetal-masked aldehyde groups intact, and these polymers will remain water soluble so long as they are not acidified. These water soluble polymers are likewise readily formed into any desired shape and are admirably suited for use wherever regenerated cellulose or polyvinyl alcohol structures have previously been used. In view of subsequent simple insolubilization by self-cross-linking whenever desired, which renders the structures water insoluble, these polymers may often be used with greatly improved results. These water soluble polymers may, for example, be used as adhesives for cellophane, paper, cloth and various organic and inorganic substances; as adherent, permanent finishes for fabrics, or as permanent sizes for yarns, particularly nylon. These self-insolubilizing polymers are useful in producing protective coverings, especially for those uses where water sensitivity is harmful. In polarizing structures, they are much less sensitive to moisture than is polyvinyl alcohol, commonly used for this purpose heretofore. They are useful as substitutes for Holland cloth or as sausage casings.

Polyvinyl alcohol is incompatible with viscose and even on xanthation, does not give a smooth, uniform mixture. However, interpolymers of this invention comprised largely of polyvinyl alcohol, e. g. the interpolymer of an acrolein acetal and vinyl acetate which has been subjected to hydrolysis (saponification) in an alkaline medium with the freeing of the hydroxy groups while the acetal groups remain intact, are miscible with viscose and such solutions may be spun or cast to produce filaments, yarns, films and the like having very interesting properties. When such compositions are extruded into coagulating but non-regenerating baths, the acetal-masked aldehyde group is not altered and the products may subsequently be stretched or otherwise worked or modified before effecting cross-linking within the structure. Alternatively, such compositions can be extruded into acid coagulating baths with the simultaneous regeneration of the cellulose from its xanthate and unmasking and simultaneous cross-linking of the aldehyde groups.

The partially hydrolyzed interpolymers of this invention comprised of polyvinyl alcohol, e. g. the alkaline hydrolyzed interpolymers of vinyl acetate and acrolein acetal, can be hot drawn in a manner similar to the drawing of polyvinyl alcohol. Considerable of the increased strength brought about by the drawing is maintained after insolubilization. Furthermore, structures exhibiting strong shrinkage characteristics may be obtained by such drawing procedures which are well suited for use as shrinkable wrappers.

The term "polyvinyl alcohol" is generally used throughout this specification to describe a polyvinyl product containing a sufficiently large proportion of hydroxyl groups in the molecule to render the polymer soluble in water which may in some instances be heated, the hydroxyl content being in the neighborhood of 70% or more of the theoretical maximum and obtained, for example, by hydrolyzing polyvinyl acetate until all but a small percentage, e. g. 30% or less, of the theoretical acetyl maximum content is split off.

The polymers of this invention are useful in the preparation of polymeric dye intermediates, for example by saponification or hydrolysis to polymers containing aldehyde groups, followed by reaction with a monomeric dye intermediate containing an aldehyde-reactive group. Such polymeric dye intermediates have been found of value in processes of color photography.

The hydrolyzed, aldehyde group-containing polymers are also useful in the preparation of dispersions of silver halide, of interest in photography.

In view of their dual characteristics (organic solvent-soluble filament- and film-formers, when in the unsaponified form but water soluble or water swellable and compatible with many water sensitive materials used for coating, impregnation, etc. when saponified), certain of the polymeric compounds of this invention, e. g. the acrolein acetyl-vinyl acetate interpolymers, are especially suited for use as anchoring agents of water sensitive coatings to organic solvent-soluble base materials.

Any departure from the description given above which conforms to the principles of the invention is intended to be included within the scope of the claims.

I claim:

An interpolymer of allylidene diethoxide and vinyl acetate wherein the mol ratio of allylidene diethoxide to vinyl acetate is from 1:2 to 1:20.

EMMETTE FARR IZARD.

REFERENCES CITED

The following references are of record in the file of this patent:

UNITED STATES PATENTS

| Number | Name | Date |
| --- | --- | --- |
| 1,746,665 | Matheson | Feb. 11, 1930 |
| 2,332,896 | D'Alelio | Oct. 26, 1943 |
| 2,341,306 | Agre | Feb. 8, 1944 |

FOREIGN PATENTS

| Number | Country | Date |
| --- | --- | --- |
| 340,008 | Great Britain | Dec. 19, 1930 |